United States Patent [19]
Park

[11] Patent Number: 6,043,484
[45] Date of Patent: Mar. 28, 2000

[54] PRINTER OPTICAL SCANNING APPARATUS AND COLOR PRINTER OPTICAL SCANNING SYSTEM

[75] Inventor: Sang-shin Park, Suwon, Rep. of Korea

[73] Assignee: Samsung Electronics Co., Ltd., Kyungki-do, Rep. of Korea

[21] Appl. No.: 09/129,039

[22] Filed: Aug. 4, 1998

[30] Foreign Application Priority Data

Aug. 25, 1997 [KR] Rep. of Korea ........................ 97-40715

[51] Int. Cl.[7] .................................................... H01J 3/14
[52] U.S. Cl. ........................................... 250/234; 347/235
[58] Field of Search .............................. 250/234, 214 R, 250/235, 236, 559.4, 559.44; 356/375; 347/235, 250, 115, 234, 248; 355/53, 64

[56] References Cited

U.S. PATENT DOCUMENTS 5,255,063 10/1993 Ideyama et al. ........................ 355/327

*Primary Examiner*—Que T. Le
*Attorney, Agent, or Firm*—Sughrue, Mion, Zinn, Macpeak & Seas, PLLC

[57] ABSTRACT

An optical scanning apparatus includes an optical scanning unit, a photodetector, a belt position identifying portion for counting a pulse maintenance time corresponding to the width of the pulse signal output from the photodetector in response to the input light and outputting the counted time, a scanning delay determining portion for outputting delay time information corresponding to the result of subtracting the pulse maintenance time from a set image scanning initialization delay during the time from the beginning of the pulse until image scanning is initialized, a scanning start instructing portion for outputting an image scanning start signal after counting the delay time from the end of the input pulse, and a scanning controlling portion for controlling the driving of the optical scanning unit such that scanning corresponding to image information is initialized by the optical scanning unit in synchronization with the image scanning start signal. A color printer optical scanning system wherein each of the optical scanning controllers of the other optical scanning apparatuses include a register for storing the delay time information output from the scanning delay determining portion, a scanning start instructing portion for counting the time corresponding to the delay time information output from the register from the end of the pulse signal output from the corresponding photodetector occurs and outputting an image scanning start signal, and a scanning controlling portion for controlling the driving of the optical scanning unit such that scanning corresponding to image information is initialized by the optical scanning unit in synchronization with the image scanning start signal. With this apparatus and system, an image in which constant marginal spaces are maintained on paper can be obtained, regardless of a degree of slipping of the photoreceptor belt.

5 Claims, 4 Drawing Sheets

PRINTER OPTICAL SCANNING APPARATUS AND COLOR PRINTER OPTICAL SCANNING SYSTEM

BACKGROUND OF THE INVENTION

1. Field of the Invention

The present invention relates to a printer optical scanning apparatus and a color printer optical scanning system using the apparatus, and more particularly, to a printer optical scanning apparatus that appropriately controls the image information scanning time of an optical scanning unit in response to latitudinal movements of a photoreceptor belt in a direction perpendicular to a proceeding direction of the photoreceptor belt, and to a color printer optical scanning system using the apparatus.

2. Description of the Related Art

FIG. 1 shows a general printer. In the printer, a photoreceptor belt 14 circulates in a direction indicated by the arrows around three rollers 11, 12, and 13. A resetter 15, optical scanning units 30, developing units 17, a drying unit 18, and a transferring unit 20 are arranged near the circulating path of the photoreceptor belt 14 and are spaced a predetermined distance apart from one another.

In a printing process, the optical scanning units scan rays of light to the photoreceptor belt 14, circulating via the resetter 15. An electrostatic latent image is formed on the photoreceptor belt 14 by the scanned rays and then developed by a developer supplied by each of the developing units 17. A color image is formed by the optical scanning units 30 and the developing units 17, respectively scanning rays of different color information and performing development using developers corresponding to the scanned colors.

As the photoreceptor belt 14 continues to circulate, the color image formed on the photoreceptor belt 14 passes the drying unit 18 and is transferred to a transfer roller 21 that is rotating such that a part of the roller is engaged with the photoreceptor belt 14. The image that is transferred to the transfer roller 21 is then transferred to a sheet of paper 23 which passes between the transfer roller 21 and the press roller 22 which are engaged with each other and rotate to advance the paper 23.

In a printer operating as described above, four optical scanning units 30 are spaced with each other in order to display a color image and scan color information corresponding to yellow, magenta, cyan, and black, respectively.

Each optical scanning unit 30, one of which is shown in FIG. 2, is comprised of the same components. Referring to the drawing, the optical scanning unit 30 has a light source 31, a rotary polygonal mirror 32, a motor M, and a lens unit 33.

An optical scanning apparatus includes the scanning unit 30, an optical scanning controller 35, and a photodetector 34. During the operation of the optical scanning apparatus, the photodetector 34 detects the scanned light, from a position beyond the photoreceptor belt 14 and the edge of the photoreceptor belt 14, among the light rays output from the optical scanning unit 30, and outputs a corresponding pulse signal to the optical scanning controller 35. A scanning start instructing portion 36 of the optical scanning controller 35 determines a falling edge of the input pulse signal when the scanned light arrives at the edge of the photoreceptor belt 14. The scanning start instructing portion 36 then outputs an image information scanning start signal to a scanning controlling portion 37 after counting the optical scanning time corresponding to distance a from the edge of the photoreceptor belt 14 to a set image information recording area D. The scanning controlling portion 37 drives the light source 31 such that an optical signal, corresponding to image data, is output after being synchronized with the scanning start signal of the scanning start instructing portion 36.

However, in the conventional optical scanning apparatus described above, because the paper is always loaded to the same position, when the photoreceptor belt slips from its normal path, the image position to be transferred to the paper is moved in an amount corresponding to the slipping distance of the photoreceptor belt. As a result, a desired arrangement of a print image on a paper cannot be obtained.

SUMMARY OF THE INVENTION

To solve the above problem, it is an objective of the present invention to provide a printer optical scanning apparatus and a color printer scanning system that enables a print image of a desired form to be obtained on a sheet of paper by controlling the initialization time of optical scanning that takes into account slipping of the photoreceptor belt.

To achieve the above objective, there is provided an optical scanning apparatus that includes: (1) an optical scanning unit for scanning a ray of light to a circulating photoreceptor belt; (2) a photodetector arranged to detect the ray of light scanned by the optical scanning unit, from a predetermined position beyond the photoreceptor belt to the edge thereof, and output an electric signal corresponding to the input light; (3) a belt position identifying portion for counting a pulse maintenance time corresponding to the width of the pulse signal output from the photodetector, in response to the input light, and outputting the counted time; (4) a scanning delay determining portion for outputting delay time information corresponding to the result obtained by subtracting the pulse maintenance time from a set image scanning initialization delay time during the time from the beginning of the pulse until image scanning is initialized; (5) a scanning start instructing portion for outputting an image scanning start signal after counting the delay time from the end of the input pulse; and (6) a scanning controlling portion for controlling the driving of the optical scanning unit such that scanning corresponding to image information is initialized by the optical scanning unit in synchronization with the image scanning start signal.

To achieve the above objective, there is provided an optical scanning system for a color printer, including a plurality of optical scanning apparatuses arranged to be capable of scanning optical information of different colors on a circulating photoreceptor belt. Each of the optical scanning apparatuses include: (1) an optical scanning unit for scanning a ray of light onto the photoreceptor belt; (2) a photodetector arranged to detect the ray of light scanned by the optical scanning unit, from a predetermined position off the photoreceptor belt to the edge thereof, and output an electric signal corresponding to the input light; and (3) an optical scanning controller for controlling the optical scanning of the optical scanning unit using the electric signal output from the photodetector.

A first optical scanning controller of a first optical scanning apparatus is positioned at the head, in a preceding direction of the photoreceptor belt, among the optical scanning apparatuses and includes: (1) a belt position identifying portion for counting a pulse maintenance time corresponding to the width of the pulse signal output from the photodetector, in response to the input light, and outputting the counted time; (2) a scanning delay determining portion for outputting delay time information corresponding to the result of subtracting the pulse maintenance time from a set image scanning initialization delay time during a time from the beginning of the pulse until image scanning is initialized; (3) a scanning start instructing portion for outputting an image scanning start signal after counting the delay time from the end of the input pulse; and (4) a scanning controlling portion for controlling the driving of the optical scanning unit such that scanning, corresponding to image information, is initialized by the optical scanning unit in synchronization with the image scanning start signal.

Each of the optical scanning controllers of the rest of the optical scanning apparatuses include: (1) a register for storing the delay time information output from the scanning delay determining portion; (2) a scanning start instructing portion for counting the time, corresponding to the delay time information output from the register, from the end of the pulse signal output from the corresponding photodetector and outputting an image scanning start signal; and (3) a scanning controlling portion for controlling the driving of the optical scanning unit such that scanning corresponding to image information is initialized by the optical scanning unit in synchronization with the image scanning start signal.

BRIEF DESCRIPTION OF THE DRAWINGS

The above objective and advantages of the present invention will become more apparent by describing in detail a preferred embodiment with reference to the attached drawings in which.

DESCRIPTION OF THE PREFERRED EMBODIMENT

Figure 3:
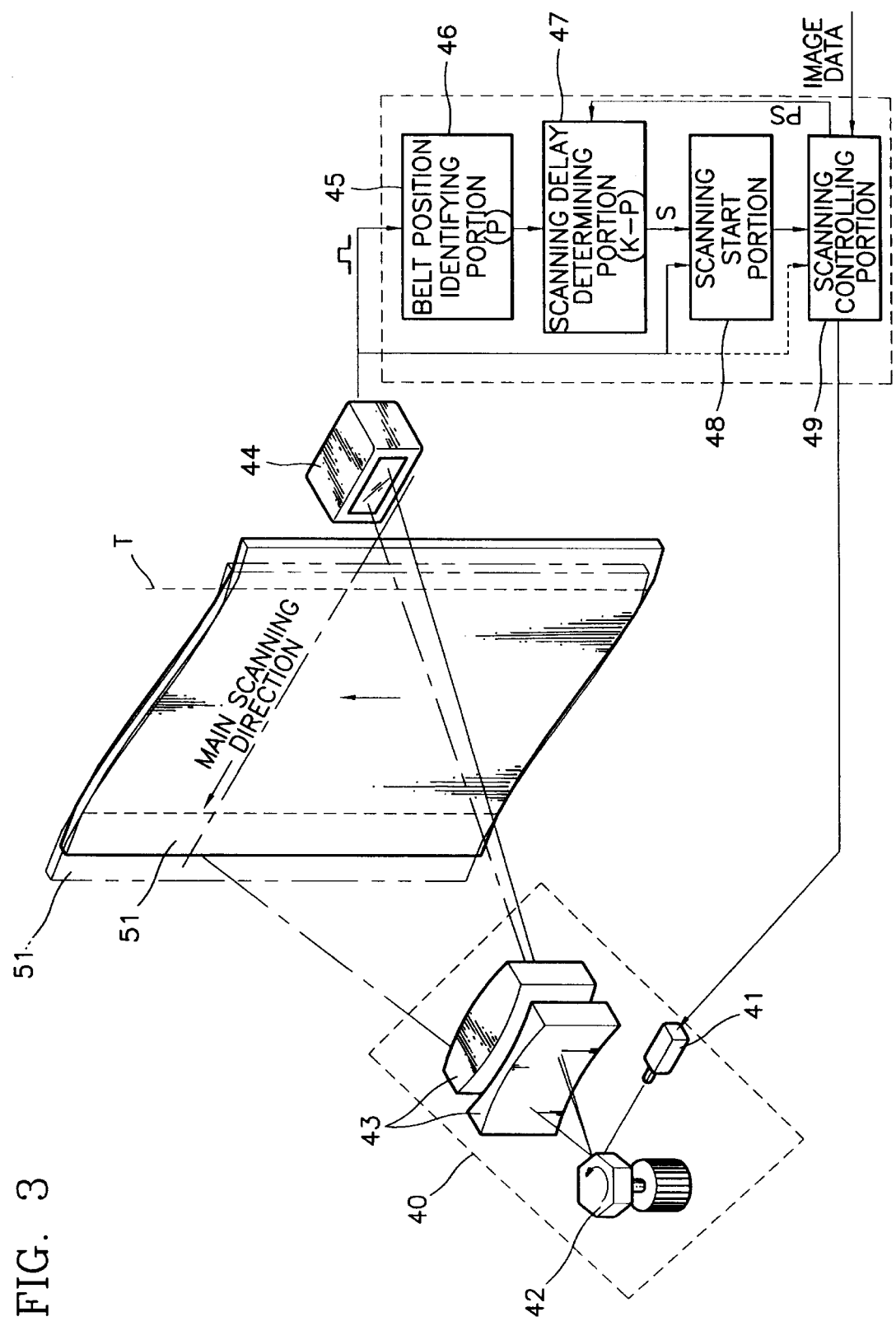
FIG. 3 is a view illustrating an optical scanning apparatus according to the present invention.

Referring to FIG. 3, the optical scanning apparatus of a printer according to the present invention includes: (1) an optical scanning unit 40 for scanning a ray of light onto a circulating photoreceptor belt 51 in a main scanning direction, as indicated by an arrow; (2) a photodetector 44 for detecting light incident around the edge of the photoreceptor belt 51; and (3) an optical scanning controller 45 for controlling the drive of the optical scanning unit 40 by using an output signal of the photodetector 44.

The optical scanning unit 40 has a light source 41, a rotary polygonal mirror 42, and a lens unit 43 as its main components. It is controlled by the optical scanning controller 45 at a fixed position and scans a ray of light in a lateral direction of the photoreceptor belt 51.

The photodetector 44 receives the light scanned by the optical scanning unit 40, from a predetermined position off the photoreceptor belt 51 to the edge of the photoreceptor belt 51, and outputs a corresponding pulse signal.

The optical scanning controller 45 controls the optical scanning unit 40 such that the optical scanning unit 40 can initialize scanning from a fixed reference position T set by the system with respect to image information for one page, regardless of lateral movement of the photoreceptor belt 51. The reference position T can be changed by page. The optical scanning controller 45 comprises: (1) a belt position identifying portion 46; (2) a scanning delay determining portion 47; (3) a scanning start instructing portion 48; and (4) a scanning controlling portion 49.

The belt position identifying portion 46 counts a pulse maintenance time P corresponding to the width of the pulse signal output from the photodetector 44 and outputs the counted time. The pulse maintenance time P contains information regarding slipping of the circulating photoreceptor belt 51 in a main scanning direction.

The scanning delay determining portion 47 outputs to the scanning start instructing portion 48 ready time information S, corresponding to the result (K–P), by subtracting the pulse maintenance time P, provided from the belt position identifying portion 46, from a set image scanning initialization delay time K, corresponding to the time required for light scanned to move from the beginning of the pulse signal to the reference position T, where image scanning corresponding to actual image data begins. The scanning delay determining portion 47 maintains the calculated delay time information S until a next page sync signal PS is input. The page sync signal PS is generated by the scanning controlling portion 49 whenever the image data for one page is input.

The scanning start instructing portion 48 counts time, corresponding to the delay time S input from the scanning delay determining portion 47, from the end of the pulse signal from the photodetector 44, and outputs an image scanning start signal to the scanning controlling portion 49.

When the image scanning start signal is input from the scanning start instructing portion 48, the scanning controlling portion 49 controls on/off driving of the optical scanning unit 40 corresponding to image data.

The scanning controlling portion 49 stops the driving of the light source 41 when the pulse signal is input from the scanning start instructing portion 48 until the image scanning start signal from the scanning start instructing portion 48 is input.

Figure 4:
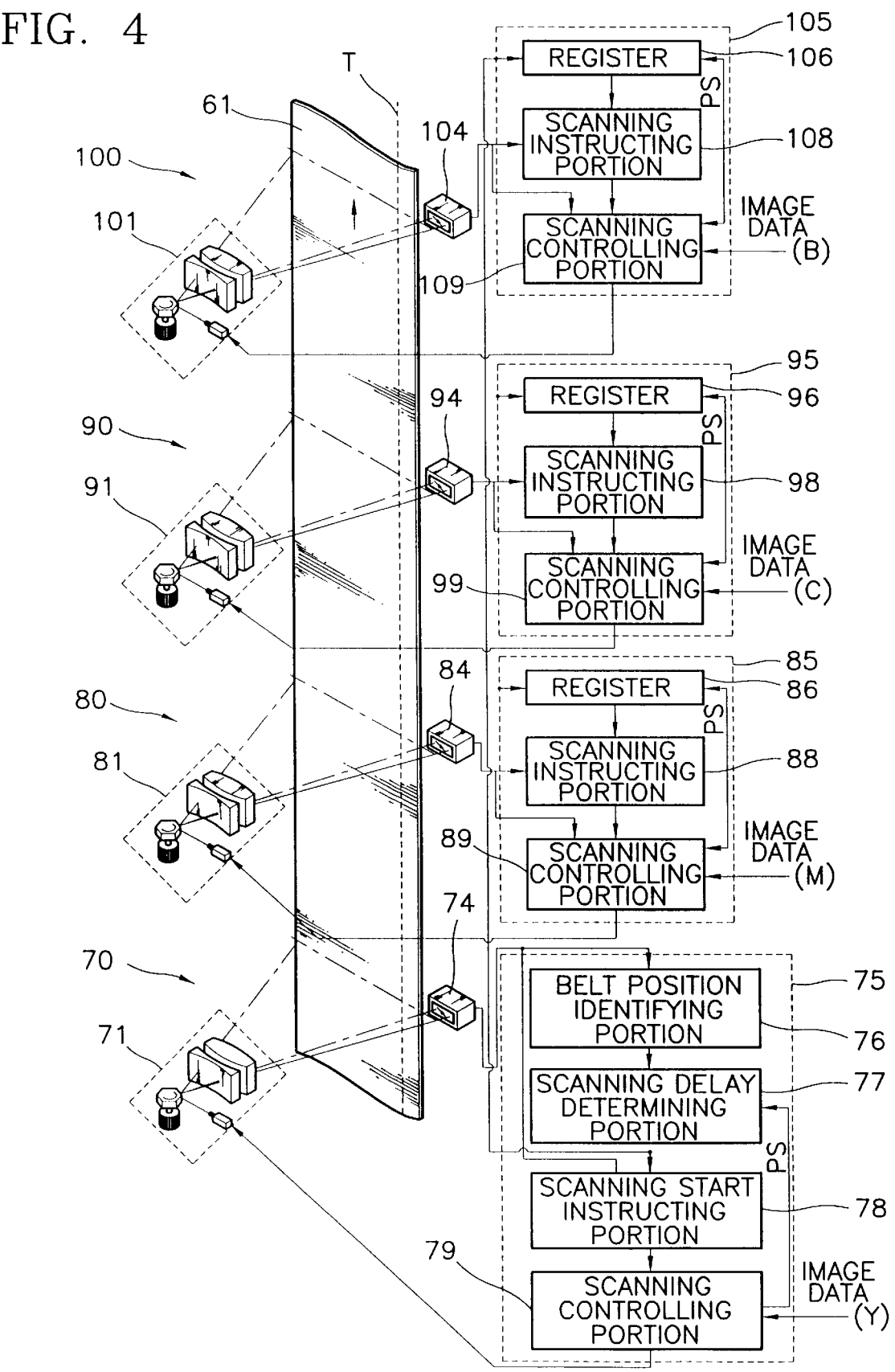
FIG. 4 is a view illustrating an optical scanning system for a color printer according to the present invention.

A color printer optical scanning system according to the present invention will be described below with reference to FIG. 4.

Referring to the drawing, first, second, third, and fourth optical scanning apparatuses 70, 80, 90, and 100, for scanning rays of light are provided, each spaced a predetermined distance apart from a photoreceptor belt 61 and parallel to each other.

The optical scanning apparatuses 70, 80, 90, 100 have: (1) optical scanning units 71, 81, 91, and 101; (2) photodetectors 74, 84, 94, and 104; and (3) optical scanning controllers 75, 85, 95, and 105, respectively. The four optical scanning apparatuses 70, 80, 90, and 100 respectively scan color information corresponding to yellow (Y), magenta (M), cyan (C), and black (B).

A full image without discrepancy can be formed in the respective scanned images only when the optical scanning by each optical scanning unit 71, 81, 91, or 101 is performed to the same area on the photoreceptor belt 61 with respect to the same page.

To attain the above result, in the optical scanning system of the present invention, a first optical scanning controller 75 in the first optical scanning apparatus 70 has a belt position identifying portion 76, a scanning delay determining portion 77, a scanning start instructing portion 78, and a scanning controlling portion 79, all of which have the same functions described above with reference to FIG. 3.

The optical scanning controllers 85, 95, and 105 of the second, third, and fourth optical scanning apparatuses 80, 90, and 100, provided along a preceding direction of the photoreceptor belt 61, have registers 86, 96, and 106, scanning start instructing portions 88, 98, and 108, and scanning controlling portions 89, 99, and 109, respectively.

To avoid the redundant descriptions of the second to fourth optical scanning apparatuses 80, 90, and 100, only the operation of the second optical scanning apparatus 80 relating to Magenta color information will be described.

In the second optical scanning apparatus 80, delay time information provided by the scanning delay determining portion 77 of the first optical scanning apparatus 70 is stored in the register 86. The register 86 then outputs the stored delay time information to the scanning start instructing portion 88, as it is, until the next page sync signal PS is input from the scanning controlling portion 89.

The scanning start instructing portion 88 counts time, corresponding to the delay time information provided from the register 86, from the end of the pulse signal output from the photodetector 84 time and outputs an image scanning start signal to the scanning controlling portion 89. The scanning controlling portion 89 controls the optical scanning unit 81 such that optical scanning, corresponding to the color information for magenta, can be made in synchronization with the image scanning start signal of the scanning start instructing portion 88.

The optical scanning controllers 95 and 105 of the third and fourth optical scanning apparatuses 90 and 100 have the same structure as that of the optical scanning controller 85 of the second optical scanning apparatus 80. Accordingly, since the delay time information calculated by the scanning delay determining portion 77, provided at the first optical scanning controller 75 of the first optical scanning apparatus 70, is stored for use in each of the registers 86, 96, and 106 of the second, third and fourth optical scanning apparatuses 80, 90, and 100, corresponding color information can be scanned on the photoreceptor belt 61 at the same reference position T, as in the first optical scanning apparatus 70. The reference position T is determined by adjusting the image scanning initialization delay time K stored in the scanning delay determining portion 77.

Figure 1:
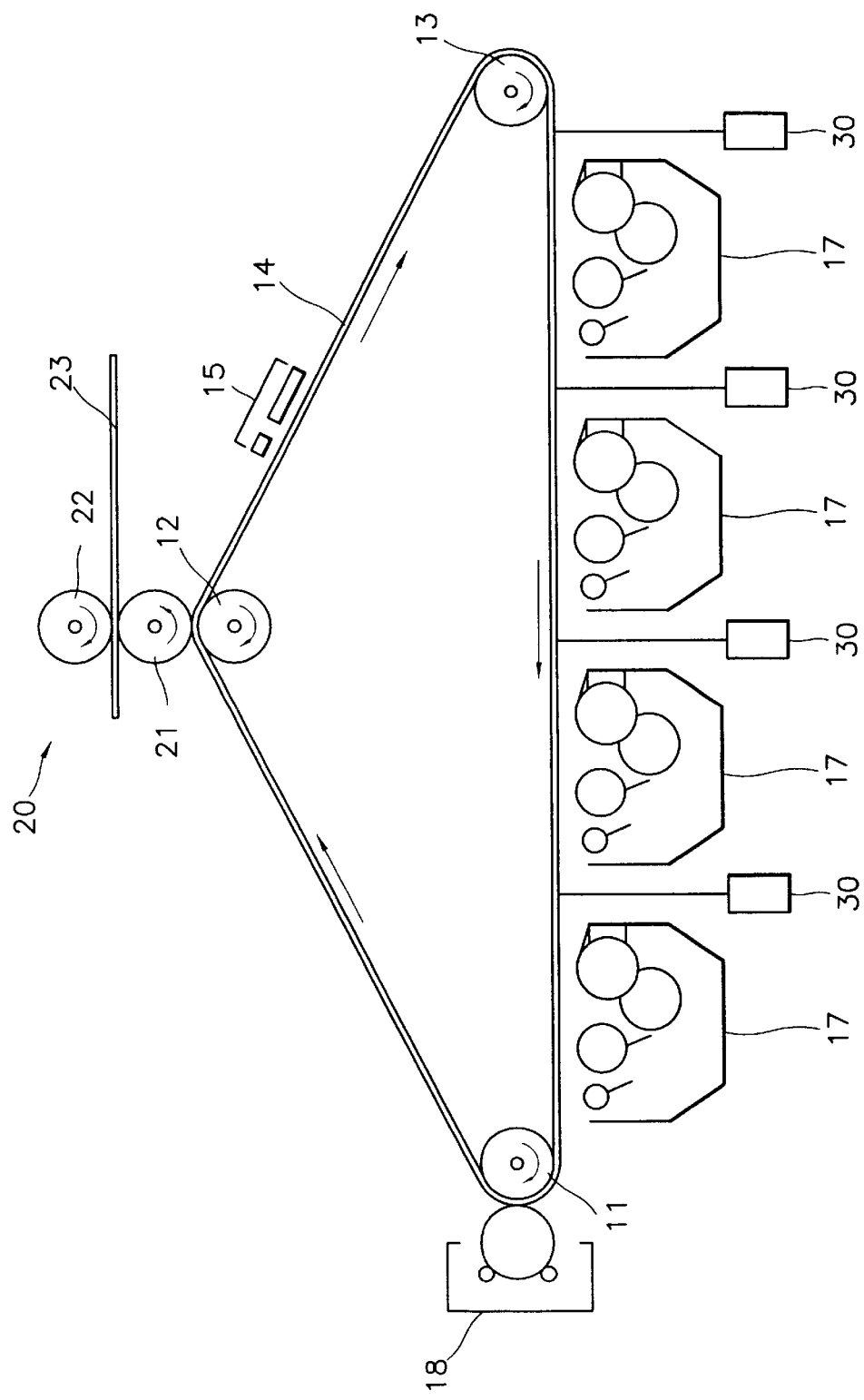
FIG. 1 is a sectional view illustrating a general electrophotographic color printer.
Figure 2:
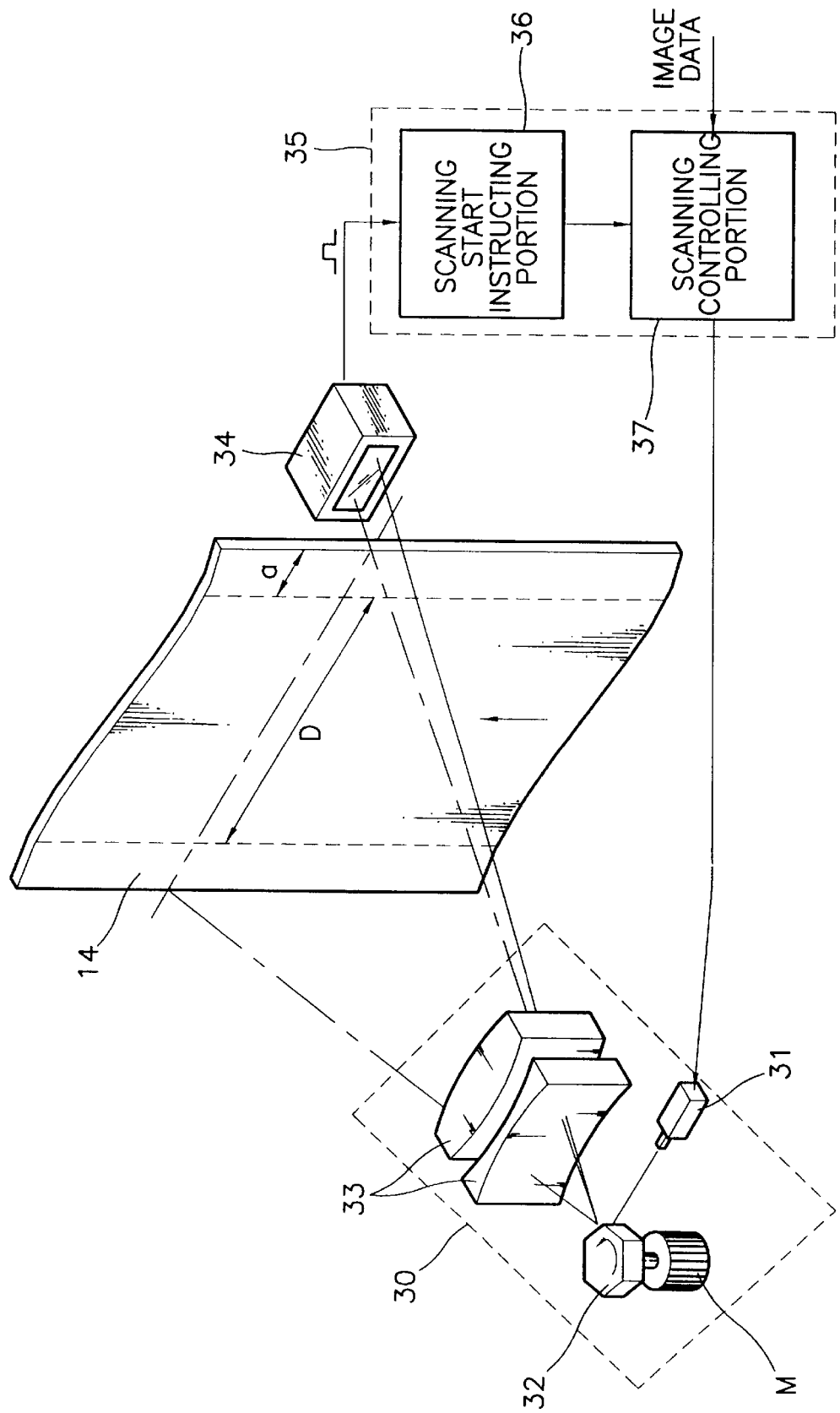
FIG. 2 is a view illustrating a conventional optical scanning apparatus.

As a result, since the optical scanning of image information corresponding to the same page by the respective optical scanning apparatuses 70, 80, 90, and 100 is initialized toward the fixed same reference position T, an image, in which constant marginal spaces are maintained, is printed on the paper (see FIG. 1) loaded to a constant position, regardless of lateral movements of the photoreceptor belt 61.

As described above, in the printer optical scanning apparatus and the color printer optical scanning system according to the present invention, an image on paper, in which constant marginal spaces are maintained, can be obtained, regardless of a degree of slipping of the photoreceptor belt.

What is claimed is:

1. An optical scanning apparatus comprising:
   an optical scanning unit for scanning a ray of light to a circulating photoreceptor belt;
   a photodetector arranged to detect the ray of light scanned by said optical scanning unit from a predetermined position beyond said photoreceptor belt to the edge thereof and output an electric pulse signal corresponding to the scanned light;
   a belt position identifying portion for counting a pulse maintenance time corresponding to the width of the pulse signal output from said photodetector in response to the input light and outputting the counted time;
   a scanning delay determining portion for outputting delay time information corresponding to the result of subtracting the pulse maintenance time from a set image scanning initialization delay time during a time from the beginning of the pulse until image scanning is initialized;
   a scanning start instructing portion for outputting an image scanning start signal after counting the delay time from the end of the pulse signal; and
   a scanning controlling portion for controlling the driving of said optical scanning unit such that scanning corresponding to image information is initialized by said optical scanning unit in synchronization with said image scanning start signal.

2. The optical scanning apparatus as claimed in claim 1, wherein said scanning delay determining portion maintains the set delay time information according to a page sync signal applied by said scanning controlling portion until the next page sync signal is applied and outputs the maintained delay time information.

3. An optical scanning system for a color printer comprising:
   a plurality of optical scanning apparatuses arranged to be capable of scanning optical information of different colors on a circulating photoreceptor belt, each of said optical scanning apparatuses comprising:
      an optical scanning unit for scanning a ray of light onto said photoreceptor belt;
      a photodetector arranged to detect the ray of light scanned by said optical scanning unit from a predetermined position off said photoreceptor belt to the edge thereof and output an electric pulse signal corresponding to the scanned light; and
      an optical scanning controller for controlling the optical scanning of said optical scanning unit using the electric signal output from said photodetector;
   wherein a first optical scanning controller of a first optical scanning apparatus positioned at the head in a preceding direction of said photoreceptor belt among said optical scanning apparatuses comprises:
      a belt position identifying portion for counting a pulse maintenance time corresponding to the width of the pulse signal output from said photodetector in response to the scanned light and outputting the counted time;
      a scanning delay determining portion for outputting delay time information corresponding to the result of subtracting the pulse maintenance time from a set image scanning initialization delay time during a time from the beginning of the pulse until image scanning is initialized;
      a scanning start instructing portion for outputting an image scanning start signal after counting the delay time from the end of the pulse signal; and
      a scanning controlling portion for controlling the driving of said optical scanning unit such that scanning corresponding to image information is initialized by said optical scanning unit in synchronization with the image scanning start signal; and
   wherein each of said optical scanning controller of the other optical scanning apparatuses comprises:
      a register for storing the delay time information output from said scanning delay determining portion;
      a scanning start instructing portion for counting the time corresponding to the delay time information output from said register from the end of the pulse signal output from said corresponding photodetector occurs and outputting an image scanning start signal; and a scanning controlling portion for controlling the driving of said optical scanning unit such that scanning corresponding to image information is initialized by said optical scanning unit in synchronization with the image scanning start signal.

4. The optical scanning system for a color printer as claimed in claim 3, wherein said scanning delay determining portion maintains the set delay time information according to a page sync signal applied by said scanning controlling portion of said first optical scanning controller until the next page sync signal is applied and outputs the maintained delay time information.

5. The optical scanning system for a color printer as claimed in claim 3, wherein said register maintains the delay time information according to a page sync signal applied by said corresponding scanning controlling portion until the next page sync signal is applied and outputs the maintained delay time information.

* * * * *